United States Patent [19]

Merli et al.

[11] 4,177,852

[45] Dec. 11, 1979

[54] STRUCTURE OF PNEUMATIC TIRE COVERS

[75] Inventors: Claudio Merli, Cormano; Carlo Francia, Monza, both of Italy

[73] Assignee: Euteco S.p.A., Milan, Italy

[21] Appl. No.: 843,106

[22] Filed: Oct. 18, 1977

[30] Foreign Application Priority Data

Oct. 19, 1976 [IT] Italy ................. 28523 A/76

[51] Int. Cl.² ............................................. B60C 9/02
[52] U.S. Cl. ........................ 152/354 R; 152/362 R
[58] Field of Search ............. 152/354 RB, 361 DM, 152/357 R, 362 R, 354 R, 355

[56] References Cited

U.S. PATENT DOCUMENTS

| 1,346,081 | 7/1920 | Drope | 152/362 R |
|---|---|---|---|
| 2,703,128 | 1/1955 | Darrow | 152/354 RB |
| 3,301,302 | 1/1967 | Wild et al. | 152/354 |
| 3,504,724 | 4/1970 | Sperberg | 152/354 |
| 3,509,930 | 5/1970 | Mirtain | 152/354 |
| 3,631,667 | 1/1972 | Marzocchi | 152/359 |
| 3,672,423 | 6/1972 | Duduk | 152/354 RB |

Primary Examiner—Joseph F. Peters, Jr.
Assistant Examiner—D. W. Underwood
Attorney, Agent, or Firm—Sughrue, Rothwell, Mion, Zinn and Macpeak

[57] ABSTRACT

A pneumatic tire cover has a carcase comprises at least one inner radial ply of threads of aromatic polyamide and at least two outer plies of threads having elongation values greater than those of the said aromatic polyamide and arranged in alternately crossing directions from one of said outer ply to another, while the inner radial ply or plies are such as to be able to bear the inflation pressure on its or their own.

2 Claims, 11 Drawing Figures

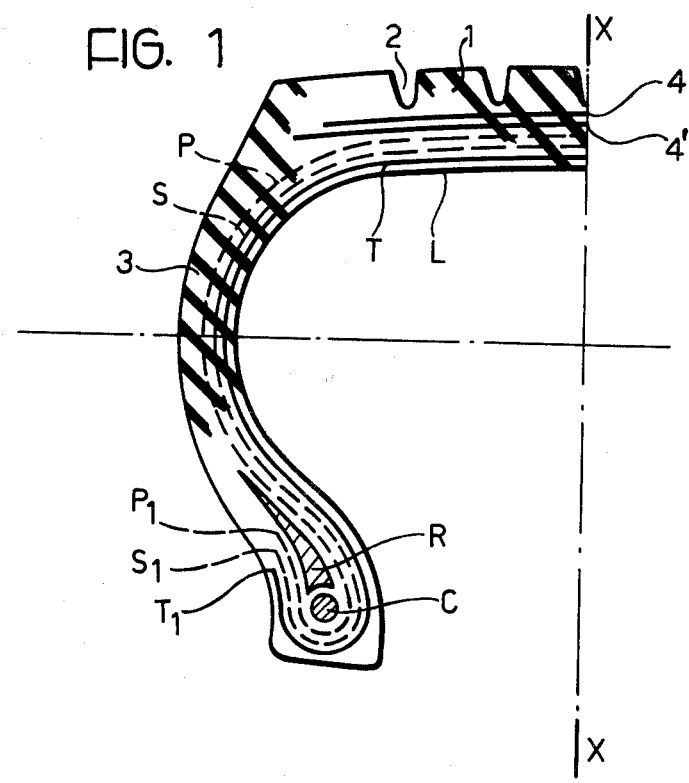
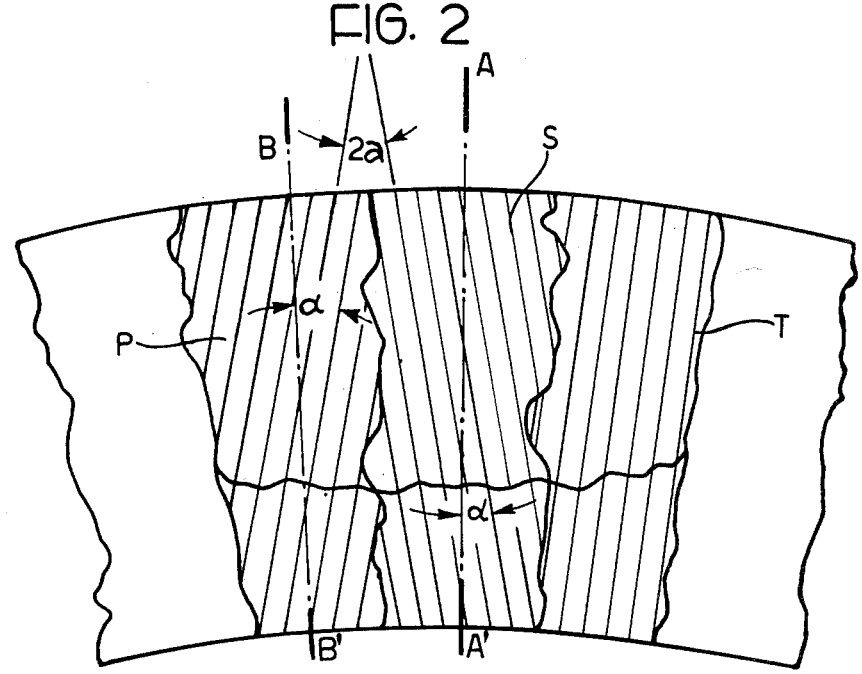

STRUCTURE OF PNEUMATIC TIRE COVERS

BACKGROUND OF THE INVENTION

This invention relates to pneumatic tire cover having a radial carcase, i.e. a carcase formed by one or more plies whose threads (cords) lie in meridian planes passing through the axis of rotation of the tire or form small angles with said planes. It is known that said tires beside the radial carcase, contain a circumferential peripheral structure which extends between the tire tread and the carcase, said structure aiming at making the tire less deformable, limiting its dragging against the ground.

The combination of the radial carcase and the circumferential structure has proved to be very advantageous because beside a long tread life, it allows an excellent comfort for driving due to the great flexibility of the sides of the tire or, equivalently, to the low rigidity of the carcase.

Said flexibility of the sides does have, however, some negative aspects given that the sides provide only very weak transverse reinforcement when the tire is stressed by forces in the direction of the axis of rotation.

Said forces arise, for example, in bends when a centrifugal force develops, acting on the centre of gravity of the vehicle.

Furthermore, the accentuated flexibility of the sides makes the strength of the tire critical in the region of the beads and, more particularly, in the region of the connection between the extremely pliable sides and the beads, which bear on the lateral projections of the mounting rim.

These inconveniences are particularly relevant in the case of tires for industrial motor vehicles because of the high stresses to which they are subject.

As it is known, it is possible nowadays to manufacture tires of this kind with only one carcase ply, by means of the use of fabrics with steel cords having very high values of unitary strength.

The use of such fabrics with steel cords, together with other reinforcements in the same material, gives satisfactory solutions of the problems regarding tires for industrial motor vehicles.

Recently new synthetic fabric materials have been prepared such as aromatic polyamides (for example the product known under the trade name "Kevlar") which, as well as having a strength per unit of cross sectional area very near to that of steel, possess an improved resistance to fatigue, render easier and therefore less costly the cutting and preparation of the partly finished product in general, and by reducing the weight of the tire increase indirectly the driving comfort by a reduction of the so-called "unsprung weight" of the vehicle. The introduction of such materials as reinforcements in tires has however again raised the problem regarding wear in the region of the beads, previously considered, together with the problem of the lateral stability of the vehicle.

OBJECT OF THE INVENTION

The object of this invention is therefore a cover for tires for the wheels of vehicles of any kind, including a carcase formed by plies of aromatic polyamides, which permit the elimination, or at least a substantial reduction, of the inconveniences relating to wear in the region of the beads and of the lateral instability.

THE INVENTION

According to the invention there is provided a pneumatic tire cover of the type comprising a peripheral reinforcement formed by two or more layers of plies whose cords are arranged in a predominantly longitudinal direction, and a carcase formed by two reinforcements (or shells) each having a specific function, said carcase being characterised by the fact that:

the inner structure is formed by at least one radial ply formed by threads (cords) of aromatic polyamide, and the said threads lie in radial planes or else form small angles with said planes;

the outer structure is formed by at least two plies formed by threads (cords) of material different from that of the inner structure, the said material having elongation values from 2 to 5 times greater than those of the aromatic polyamide for loads proportional to that of the breaking load, said threads being furthermore arranged in alternately crossing directions from one ply to another, so as to form angles from 7° to 35° with the radial planes, that is angles from 14° to 70° between two successive plies;

the inner structure being furthermore able to bear the inflation pressure on its own, the outer one being able to limit the lateral flexure of the tire opposing the forces directed along the axis of rotation.

Therefore a fundamental aspect of the cover of this invention consists in the fact that the carcase is formed by two structures (or shells) which are different both in the material used and in the function performed.

More particularly, the inner structure, forming the actual radial carcase, serves as a support structure and supports all, or at least the greater part, of the inflation pressure.

Said inner structure is formed by one or more plies of aromatic polyamide, said plies being folded over the bead wires and being therefore solidly anchored to them.

The outer structure is instead formed by two or more plies having essentially a stabilizing function, in as much as it reduces or opposes those lateral flexures of the tire which take place as the vehicle is driven around a curve.

Said outer structure is preferably, but not necessarily, formed by an even number of plies, formed by threads of high extensibility, i.e. by material which has a breaking extension and an extension at intermediate loads, which is much greater than that of fibres of aromatic polyamide.

Preferably the material forming the outer structure is an aliphatic polyamide (for example the commercial product "nylon") or any other filamentary material which at loads of from ⅛ to ⅓ of the breaking load, has a greater elongation than that of aromatic polyamide undergoing an equivalent load.

In particular such elongation must be from 2 to 5 times greater than that of the threads of the aromatic polyamide.

The plies of the outer structure are, furthermore, alternatively crossed over each other and the relative threads form angles from 7° to 35° with the radial planes along which run the threads of the ply or plies forming the inner structure.

The plies forming the outer structure are folded over bead wires in the region of the bead, according to the prior art or, preferably with the arrangement described in our copending U.S. patent application Ser. No. 835,757 filed Sept. 22, 1977.

In fact, by working according to said patent application it is possible to graduate in a progressive way the flexibility of the joining area between the side and the bead of the carcase.

ADVANTAGES OF THE INVENTION

By making use of the differentiated structures of this invention it is possible to obtain a significant economy with respect to the known techniques which makes use of a single metal ply and therefore tires can be obtained which, in working conditions, have an unexpectedly high lateral stability.

Because of the high uniformity of the product, vibrations due to manufacturing imperfections are reduced to the minimum, a considerable reduction of the vibrations caused by the irregularity of the road surface is obtained, with consequent driving comfort, and a considerable lightening of the peripheral reinforcement is obtained without diminishing the life of the tread of the tire.

BRIEF DESCRIPTION OF THE DRAWINGS

Further details of the invention will become apparent from the following description of several embodiments of the invention with reference to the schematic drawing wherein FIG. 1 is a schematic cross-section of half of a pneumatic tire cover according to the invention;

FIG. 2 is a schematic and partial side view of the carcase of the pneumatic tire cover shown in FIG. 1.

DETAILED DESCRIPTION OF THE EMBODIMENTS OF THE INVENTION

Figure 3:
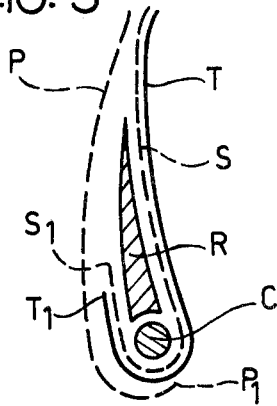
FIGS. 3 to 11 are schematic cross-sections showing several embodiments of further possible bead configurations of the pneumatic tire cover according to FIGS. 1 and 2.

In FIG. 1, which shows half of a pneumatic tire carcase symmetrical about the plane XX'', are indicated the tread 1 of the tire provided with grooves 2, the rubber layer of the side wall 3 and the peripheral reinforcement formed by the two plies 4 and 4'.

Said peripheral reinforcement for the stabilization of the tread of the tire is superimposed on the carcase and is formed by plies of metal threads, or of another kind threads, placed so as to form angles from 10° to 25° with respect to the plane of longitudinal symmetry.

In the Figure are also indicated:

with T the inner structure (or shell) (drawn with a continuous line), formed by a ply whose threads of aromatic polyamide are arranged in radial planes;

with L an inner layer, with respect to the ply T, of a mixture of elastomer for protection from the side of the inner tube;

with S and P (drawn with a broken line) the outer stabilizing structure (or shell), able to withstand those forces directed along the axis of rotation of the tire which tend to flex it laterally.

Said plies of the outer structure are formed of materials other than aromatic polyamide and in the specific case are formed by the polyamide known commercially as "nylon".

The direction of the threads of each ply of the outer structure forms an angle of 18° with the radial planes, and in addition the direction of the threads of the ply S crosses that of the threads of the ply P.

All the plies of the inner and outer structures are anchored to the bead wire C by folding back the free edges to form flaps which end with their free edges staggered and more particularly, ply T at T1, ply S at S1 and ply P at P1.

In FIG. 1 is also indicated:

with R a filling of elastomeric mixture to shape the bead.

In the case under discussion ply T is formed by threads in aromatic polyamide having a count of 1670×3 decitex, breaking load of 75 Kg, elongation at 23 Kg (i.e. equal to ⅓ of breaking load) of 2.81.

Furthermore the plies S and P forming the outer structure are formed by "nylon" threads with a count of 1400×3 decitex, with a breaking load 31.5 Kg and with an elongation at 10.5 Kg (equal to ⅓ of the breaking load) of 10.71.

The stretchability of the threads of the outer structure is therefore 3.8 times greater than that of the threads of the inner structure at a load proportional to the breaking load of the threads of said inner structure.

In FIG. 2, showing the carcase of the tire according to FIG. 1, as it is seen when the tread, the peripheral reinforcement and the side wall are in part taken away from the tire, in the region to the right are schematically indicated the radial threads of ply T forming the inner structure.

In the case in question said inner structure is formed by a single ply.

In the centre of the FIG. 2 are clearly indicated the threads of ply S which are part of the outer structure. The threads of said ply are inclined at an angle $\alpha$ equal to 18° with respect to the radial plane represented by the line AA'. On the left of the said FIG. 2 is visible ply the P forming part of the outer structure. The threads of said ply are also inclined in an angle $\alpha$ equal to 18° with respect to the radial plane represented by the line BB', but have an inclination opposite to those of the ply S.

Therefore the threads of the two plies S and P form between them an angle $2\alpha$ equal to 36°.

In the bead shown in FIG. 3 ply T, of the inner structure and ply S of the outer structure, are anchored to the bead wire C by folded back edge flaps ending in T1 and S1 respectively.

The ply P of the outer structure ends instead at P1 under the bead wire, thus forming a "closed" arrangement as opposed to the arrangement of FIG. 1, which represents an "open" scheme.

Figure 4:
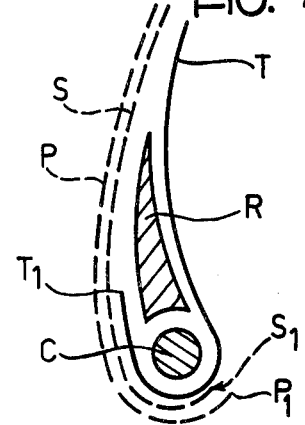

In the arrangement shown in FIG. 4 the ply T of the inner structure is anchored to the bead wire, while plies S and P of the outer structure end in S1 and P1 below the bead wire, thus forming a closed scheme.

Figure 5:
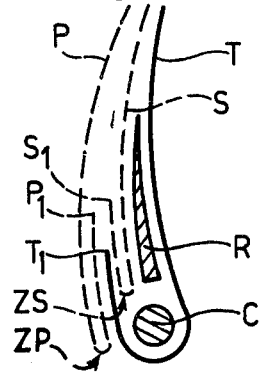

In the embodiment of FIG. 5 the ply T of the inner structure is anchored to the bead wire, while plies S and P of the outer structure are not anchored and each form a rib by folding of the edge according to said copending application.

In particular ply S forms a rib ZS between ply T and the relative fold T1; ply P forms a rib ZP placed at a lower level than the bead wire C. Ply P is folded with the flap towards the inside and ply S with the flap towards the outside.

The two flaps ending respectively in the free edges S1 and P1 thus enclose the edge T1 of ply T.

Figure 6:
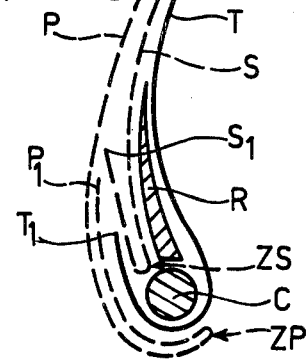

The arrangement of FIG. 6 is similar to that of FIG. 5 with the variation that the rib Zp of the ply P, terminates under the bead wire C.

Figure 7:
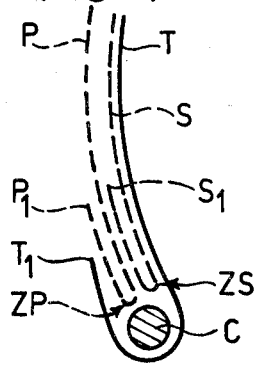
Figure 8:
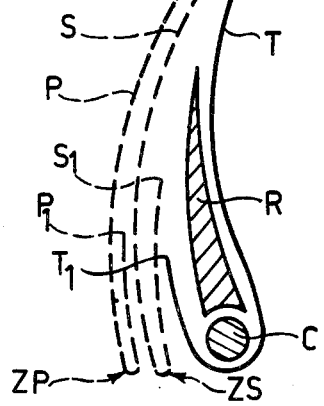

In the embodiment of FIG. 7 the ribs ZS and ZP of the plies S and P, are placed between ply T and the relative flap T1, and in the embodiment of FIG. 8 the plies S and P are folded at the edge towards the inside of the carcase and the ribs ZS and ZP thus formed are placed outside the flap T1 of ply T and lie on a lower level than the bead wire C.

Figure 9:
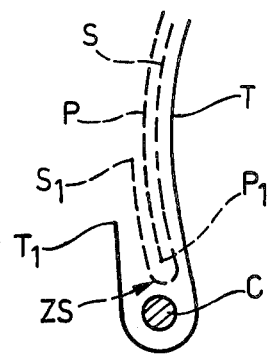

FIG. 9 shows a bead structure similar to that of FIG. 5, in which a ply S folded at the edge forms a rib ZS located between ply T and the relative flap T1, and ply P which is not folded ends at the edge P1 between ply S and its associated folded flap.

Figure 10:
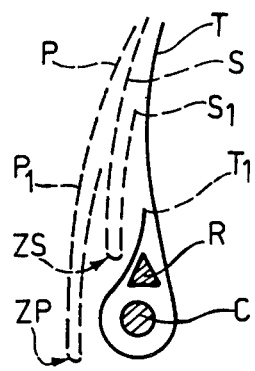

In the arrangement of FIG. 10 ply T, anchored to the bead wire C is close to the relative flap T1. Furthermore plies S and P of the outer structure are folded at the ends to form ribs ZS and ZP, placed at different levels so as to form, at least in part, a shaped filling of the bead. Lastly R indicates a filling of elastomer placed in the space between ply T and its associated flap.

Figure 11:
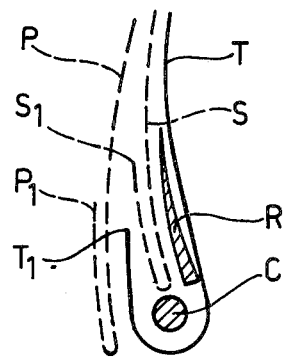

The arrangement of FIG. 11 is similar to that of FIG. 5 with a variation due to the fact that ply P of the outer structure is folded with its flap towards the outside. Also, R indicates a filling of elastomer. Obviously the arrangements shown in FIGS. 7, 9 and 10 can also be completed with elastomeric fillings, placed in a suitable position and anyway able to shape the bead of the carcase, in a way known in the art.

MODIFICATIONS OF THE EMBODIMENTS DESCRIBED

Without departing from the scope of this invention, the structures of the bead can be completed by reinforcements formed by bands of fabric, formed by steel cords or another material, able to provide a graduated flexibility in the region where the side wall and the part of the bead itself housing the bead wire, as is known in the art.

Returning once again to the scope of this invention, all the arrangement obtainable by combining the characteristics described in the text and illustrated in the Figures, which comprise a radial carcase formed by a resistant inner structure formed by one or more plies of threads of aromatic polyamide and by an outer structure formed by at least two plies, in general an even number of plies, formed by woven artificial or synthetic threads with a high stretchability, placed in an alternately crossed configuration, the angle of crossing between the successive plies being from 14° to 70°, and outer structure forming furthermore an element stabilising the lateral flexure of the tire, which opposes the forces directed along the axis of rotation.

Included in the scope of this invention are also all the arrangements which, apart from the characteristics defined above, present in the area of the bead different or asymmetric configurations from one bead to another, in all combinations possible among the arrangements described and/or illustrated.

What I claim is:

1. A pneumatic tire cover of the type comprising a peripheral reinforcement formed by two or more layers of plies whose threads are arranged in a predominantly longitudinal direction and a carcass formed by two reinforcements, each having a specific function wherein:

the inner structure is formed by at least one radial ply formed by threads (cords) of aromatic polyamide and said threads lie in radial planes, or they form small angles with said planes;

the outer structure is formed by at least two plies with threads (cords) of a material different from that of the inner structure, the said material having elongation values from 2 to 5 times greater than those of the aromatic polyamide for loads proportional to the breaking load, said threads being furthermore arranged in alternately crossed directions from one ply to another, so as to form angles from 7° to 35° with the radial planes and equivalent angles from 14° to 70° between successive plies;

the inner structure being furthermore able to bear on its own the inflation pressure, the outer structure being able to limit the lateral flexures of the tire by opposing the forces directed along the axis of rotation; and wherein the ply or plies of the inner structure are anchored to the bead wire by a folded back edge flap or flaps and the plies of the outer structure are not anchored to said bead wire and are folded back upon themselves adjacent their free edges so as to form ribs, these ribs being at least in part, located in the space between the ply or plies of the inner structure and the folded back edge flap or flaps.

2. A pneumatic tire cover of the type comprising a peripheral reinforcement formed by two or more layers of plies whose threads are arranged in a predominantly longitudinal direction and a carcass formed by two reinforcements, each having a specific function wherein:

the inner structure is formed by at least one radial ply formed by threads (cords) of aromatic polyamide and said threads lie in radial planes, or they form small angles with said planes;

the outer structure is formed by at least two plies with threads (cords) of a material different from that of the inner structure, the said material having elongation values from 2 to 5 times greater than those of the aromatic polyamide for loads proporational to the breaking load, said threads being furthermore arranged in alternately crossed directions from one ply to another, so as to form angles from 7° to 35° with the radial planes and equivalent angles from 14° to 70° between successive plies;

the inner structure being furthermore able to bear on its own the inflation pressure, the outer structure being able to limit the lateral flexures of the tire by opposing the forces directed along the axis of rotation; and wherein the ply or plies of the inner structure are anchored to the bead wire and the plies of the outer structure are not anchored to the bead wire and are folded back upon themselves adjacent their free edges so as to form ribs, these ribs being at least in part located outside the space between the ply or plies of the inner structure and the folded back edge flap or flaps.

* * * * *